(12) United States Patent
Fung et al.

(10) Patent No.: US 7,779,302 B2
(45) Date of Patent: Aug. 17, 2010

(54) AUTOMATED TESTING FRAMEWORK FOR EVENT-DRIVEN SYSTEMS

(75) Inventors: Jane C. Fung, Thornhill (CA); William G. O'Farrell, Markham (CA)

(73) Assignee: International Business Machines Corporation, Armonk, NY (US)

( * ) Notice: Subject to any disclaimer, the term of this patent is extended or adjusted under 35 U.S.C. 154(b) by 776 days.

(21) Appl. No.: 10/915,592

(22) Filed: Aug. 10, 2004

(65) Prior Publication Data

US 2006/0036910 A1   Feb. 16, 2006

(51) Int. Cl.
*G06F 11/00* (2006.01)
(52) U.S. Cl. ........................................................ 714/38
(58) Field of Classification Search .................. 714/38; 717/124–129
See application file for complete search history.

(56) References Cited

U.S. PATENT DOCUMENTS

| | | | |
|---|---|---|---|
| 5,355,484 A | | 10/1994 | Record et al. |
| 5,528,753 A | * | 6/1996 | Fortin ........................... 714/35 |
| 5,628,017 A | | 5/1997 | Kimmerly et al. |
| 5,896,495 A | * | 4/1999 | Stein et al. ..................... 714/38 |
| 5,991,536 A | * | 11/1999 | Brodsky et al. ............. 717/104 |
| 6,182,246 B1 | | 1/2001 | Gregory et al. |
| 6,212,676 B1 | | 4/2001 | Seaman et al. |
| 6,216,237 B1 | * | 4/2001 | Klemm et al. ................. 714/38 |
| 6,654,948 B1 | * | 11/2003 | Konuru et al. ............... 717/127 |
| 6,662,312 B1 | * | 12/2003 | Keller et al. ................... 714/38 |
| 6,671,830 B2 | | 12/2003 | Kaler et al. |
| 6,748,555 B1 | * | 6/2004 | Teegan et al. ................. 714/38 |
| 6,944,795 B2 | * | 9/2005 | Iline .............................. 714/39 |
| 7,020,797 B2 | * | 3/2006 | Patil ............................... 714/4 |
| 7,039,919 B1 | * | 5/2006 | Hunt ........................... 719/316 |
| 7,451,455 B1 | * | 11/2008 | El-Haj ........................ 719/320 |
| 2003/0131343 A1 | | 7/2003 | French et al. |
| 2004/0015879 A1 | | 1/2004 | Pauw et al. |

OTHER PUBLICATIONS

McGregor et al, "Collecting metrics for CORBA-based distributed systems", Software Metrics Symposium, 1998. Metrics 1998. Proceedings. Fifth International, Nov. 20-21, 1998. pp. 11-22.*
Morris, David, JUnit Automates Java Testing, Midrange Programmer, OS/400 Edition, vol. 2, No. 22, Published Nov. 6, 2003, Internet-published article printed Jul. 8, 2004, 11 pages, <http://www.midrangeserver.com/mpo/mpo110603-story01.html>.

* cited by examiner

*Primary Examiner*—Gabriel L Chu
(74) *Attorney, Agent, or Firm*—Marcia L. Doubet

(57) ABSTRACT

Techniques for programmatically coordinating, and synchronizing execution of, automated testing in event-driven systems. One or more user-provided test system event listeners listen for generated events and update test system status accordingly. A user-provided test suite definition invokes a test framework interface, thereby defining the structure of a test suite. This test suite is executed, referring to the test system status to determine when to move to a next stage (e.g., to a next test case or next test module). Test system status may also be updated directly from a test case or test module (e.g., when the test designer determines that the tested code will not generate events that can be leveraged for test status information).

17 Claims, 5 Drawing Sheets

```
Loop until done
If (condition_for_Suite1_Testcase1_Step1_met?)  310
   Then Run Suite1_Testcase1_Step1  311
Else if (condition_for_Suite1_Testcase1_Step2_met?)
   Then Run Suite1_Testcase1_Step2
         :    :    :    :
Else if (condition_for_Suite2_Testcase2_StepN_met?)
   Then Run Suite2_Testcase2_StepN End If
```

AUTOMATED TESTING FRAMEWORK FOR EVENT-DRIVEN SYSTEMS

BACKGROUND OF THE INVENTION

1. Field of the Invention

The present invention relates to computer programming, and deals more particularly with programmatically coordinating, and synchronizing execution of, automated testing in event-driven systems.

2. Description of the Related Art

Software testing for a complex application may require executing a large number of test cases to exercise sufficient coverage of paths through the software. In years past, human test personnel were largely responsible for carrying out the testing process, and in particular, for selecting which test cases should be executed, in which order, and under what conditions. A software test engineer would therefore invoke a test case, determine whether it completed successfully, and based on that determination, decide whether another test case should be invoked—or perhaps whether the test case should be re-executed after some type of software modification.

This level of human involvement in the testing process is very time-consuming and therefore costly. Accordingly, advancements have been made in automating the testing process. However, areas remain where automated testing has room for improvement. In particular, automated testing for systems that are event-based can be difficult. An event-driven system typically communicates with external and/or internal components through the use of events and listeners. Typically, listener software undergoes a registration process, whereby the listener informs the system of the event(s) in which it is interested; then, when a particular event is fired at run time, notification of the event occurrence is automatically sent to each registered listener. Listeners generally comprise application-specific code for reacting to the particular event(s) for which they register. Thus, upon notification of an event, the listener will perform certain action(s) pertaining to the event.

While automated test systems are known in the art, these systems are not sufficient for use with event-driven, listener-based systems. FIG. 1 illustrates problems that commonly arise, and will now be described.

The sample test case 100 in FIG. 1, referred to as "Testcase_1", performs a series of steps which call several methods ("Method1" through "Method4", in the example) sequentially. When this sample test case is started, Method1 in the event-driven system is invoked. See encircled numeral 1. Method1 (depicted symbolically at reference number 110) fires an event as it executes, where this event is referred to in FIG. 1 as "Event_A". See reference number 111, where the invocation of Event_A is depicted as processing performed by the code of Method1, and reference number 112, representing the triggered event. In this example, Method1 executes within a first system named "SYSTEM 1" 120, and a listener 150 for Event_A is located in a second system named "SYSTEM 2" 160. Responsive to receiving notification of the firing of Event_A, listener 150 begins to execute its corresponding code 170.

Code 170 executes, performing processing for Event_A, and will complete in an unknown period of time. However, since Method1 is a non-blocking method in this example, it will finish and return control back to Testcase_1 immediately after Event_A is fired. See encircled numeral 2, where this is illustrated. Since Testcase_1 therefore believes that Method1 is finished, Testcase_1 will then proceed to invoke Method2. Method2 thus begins to execute while SYSTEM 2 is still processing Event_A. If Method2 is also non-blocking, then Testcase_1 will invoke Method3 immediately upon completion of Method2; similarly, Method4 may be invoked immediately following completion of Method3.

At some generally unpredictable time, the code 170 for processing Event_A reaches the end. As shown at 171, this sample listener code 170 triggers "Event_B" upon completion. Reference number 172 represents the triggered Event_B, and in this example, a listener 130 for Event_B is located in System_1 120. Responsive to receiving notification of the firing of Event_B, listener 130 begins to execute its corresponding code (which, for example, might comprise printing a result related to the processing of Event_A). When listener 130 completes its execution, the result of executing Method_1 is now available for Testcase_1, as shown generally by encircled numeral 3. However, it may happen that one, two, or even all three of the subsequent methods (i.e., Method2 through Method4) in the sample test case have already completed prior to completion of the event processing triggered by execution of Method1. Thus, the results from Method1 may be returned to an incorrect state (or at least an unpredictable state) of Testcase_1.

Furthermore, additional problems may result due to the unpredictable completion time of event processing that is triggered by Method1. For example, the processing of Method2, Method3, and/or Method4 may be affected by whether Method1 has completely finished. The unpredictable duration of the event processing may therefore cause one or more of these methods to be invoked during the wrong system state, such that the entire outcome of Testcase_1 becomes invalid.

One may think that an obvious solution is to insert intentional delay between the method calls to address this problem. See FIG. 2, where a revised version of the sample test case, now referred to as "New_Testcase_1" 200, is presented. In this revised version, a "wait" instruction 210 has been inserted between execution of Method1 and Method2, and is depicted in the example as waiting for "x minutes". At first glance, this may seem like an acceptable solution. However, recall that the processing time of the events (Event_A and Event_B, in this example) is unknown. One would need to experiment with different time delays through trial and error for each method call. In addition, different computer systems might have different performance characteristics, such that the intended result is achieved on some systems but not on others. Furthermore, as time goes on, more functionality might be added to the systems under test, and each method might therefore take longer to run. As a result, one might have to repeatedly adjust the time delay in all existing test cases. In short, the intentional delay approach is error-prone and labor intensive, and is not a viable solution.

Accordingly, what is needed are techniques that avoid problems of the type described above, and which yield predictable results during automated testing of event-driven systems.

SUMMARY OF THE INVENTION

The present invention provides techniques for automated testing in event-driven systems. One or more user-provided test system event listeners listen for generated events and update test system status accordingly. A user-provided test suite definition implements a test framework interface, thereby defining the structure of a test suite. This test suite is executed, referring to the test system status to determine when to move to a next stage (e.g., to a next test case or next test module). Test system status may also be updated directly from a test case or test module (e.g., when the test designer determines that the tested code will not generate events that can be leveraged for test status information).

In one aspect, the present invention preferably comprises: registering a test system listener to listen for events generated during execution of the event-driven system being tested; receiving, by the registered test system listener, notification of the events generated during the execution of the event-driven system; updating a current testing status indication responsive to information specifying ones of the received event notifications that signal work starting or work ending; and using the current testing status indication to determine whether the testing can progress.

In another aspect, the present invention preferably comprises: obtaining a definition of a test suite, comprising one or more test cases, each of the test cases comprising one or more steps for executing code, wherein the code fires at least one event; registering a test system listener to listen for the fired events; executing the test steps of the test cases of the test suite, thereby executing the code; updating, during the executing, a test status indicating whether any of the test steps is executing, responsive to receiving a notification at the registered test system listener that one of the events has been fired by the code; and if the test status indicates that any of the test steps is executing, preventing a next one of the test steps from executing, and otherwise, allowing the next one of the test steps to execute.

The present invention will now be described with reference to the following drawings, in which like reference numbers denote the same element throughout.

BRIEF DESCRIPTION OF THE DRAWINGS

FIG. 3 depicts sample pseudocode, and is used to discuss automated testing of event-driven systems;

DESCRIPTION OF PREFERRED EMBODIMENTS

Figure 1:
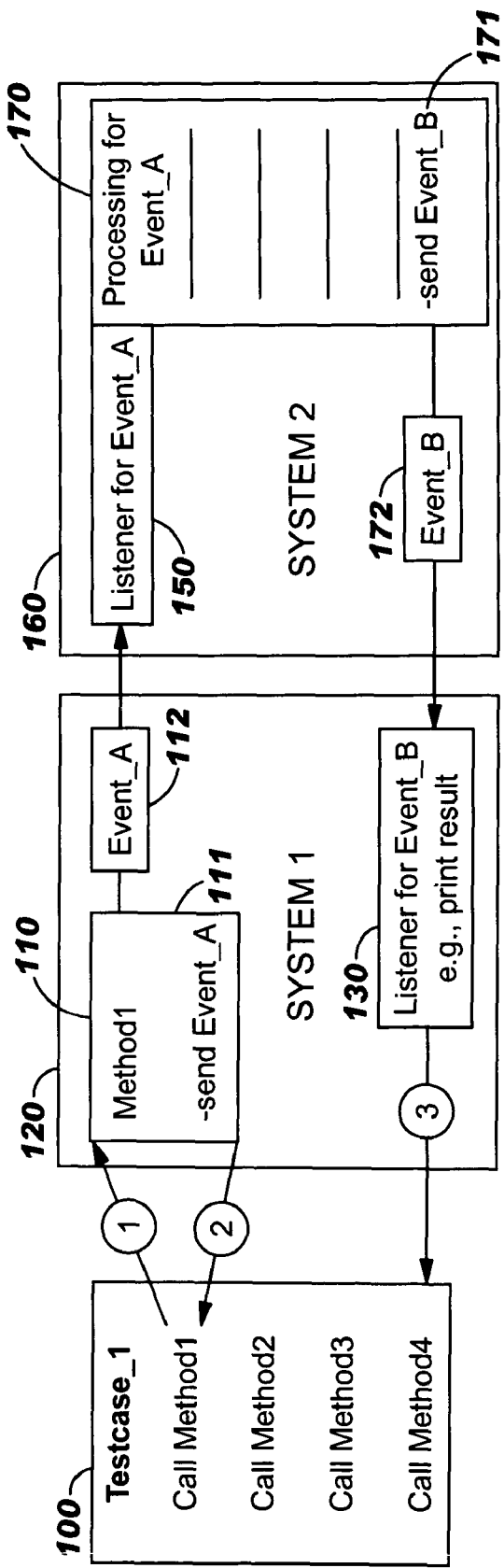
FIG. 1 provides a sample test case and is used to illustrate problems that may arise in automated testing of event-driven systems, and FIG. 2 provides a revised version of this sample test case.
Figure 2:
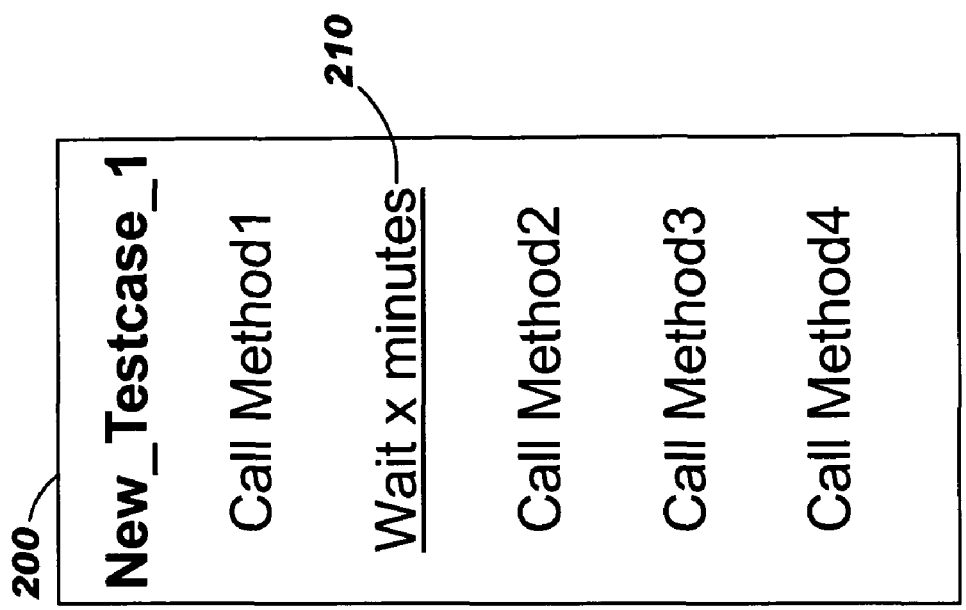

The present invention provides techniques for automated testing in event-driven systems. In an event-driven system, events are a primary means of communication among processes. Each type of event has a deterministic and logical response that the system will produce. For example, whenever Event_A from the sample test case in FIG. 1 happens, it is known that the system needs to process that event for an unknown period of time. And, whenever Event_B from the sample test case happens, it is known that the system has completed the processing of Event_A. This information can be used to determine when the system is still busy with the processing of code pertaining to Method1, and when it is not, according to preferred embodiments.

Preferred embodiments leverage this information, using events that communicate the start and end of activity. Thus, automated test execution according to the present invention uses listeners in event-driven systems to listen to events, and responsive to those events, maintains test status information that enables coordinating and synchronizing the automated testing. (Note that, according to preferred embodiments, the test system only listens to the events, and existing listeners are used to perform the actual event-specific processing. For example, listener 150 in FIG. 1 continues to execute its code 170 responsive to the firing of Event_A, and an additional test system listener for Event_A responds by updating test status information, as will be discussed in more detail below.)

The listeners in the test system of preferred embodiments provide a means to observe the state in the event-driven system under test. A data structured referred to herein as a "time table" is maintained, according to preferred embodiments, by a testing framework controller. The test system listeners update this time table, responsive to occurrence of events, with information that the test system needs to accurately coordinate the testing sequence. (Note that the term "time table" should be interpreted generally as a status-recording mechanism. This time table may be implemented in various ways, and is not limited to implementation as an actual table data structure. The time table of preferred embodiments comprises a Boolean indication of status, and may also provide further status-related information.)

Typically, automated test cases need to be run in a predefined order. A test suite may contain many test cases, and a test case may contain a number of steps. Furthermore, a test step may contain a number of method calls. Ideally, all of these items should only be run after the previous method, step, or case is completed.

One might consider using the time table information to coordinate a test sequence by having a thread that checks the status of the time table continually. If the current status fulfills the conditions to run a certain step, then that step will execute. For instance, the condition to execute the second step in a particular test case may be that the first step in that test case has successfully completed. Pseudocode 300 for a thread using this approach is illustrated in FIG. 3. As shown therein, conditional logic specifies conditions under which each of "N" test cases may be executed. The conditions may be written to include current status information obtained from the time table. In this sample 300, for example, a test designer may specify a list of one or more criteria in the condition part of an "IF" statement (see reference number 310) that determines whether a particular test case is to be executed, where that test case is identified in the "THEN" part of the "IF" statement (see reference number 311).

While the approach illustrated in FIG. 3 may be adequate in some scenarios, it would mean that all the steps for all test cases, and all the test cases for the test suite, would have to be placed in this one thread—which (except for very simple test scenarios) would typically make the test software unmanageable.

The present invention provides a testing framework that is easy to use yet achieves the goal of coordinated, synchronized test execution in an event-driven system. The testing framework manages coordination among threads performing test execution and also manages the conditions for executing particular test steps. A user of this testing framework provides the listeners and the actual contents of the test suite and test cases. As discussed briefly above, these user-provided listeners listen to the events that occur during testing and supply status information for the time table, such that the time table is updated when certain events occur. Thus, the testing framework of preferred embodiments provides an application programming interface ("API") with which the time table can be updated.

Taking the sample system in FIG. 1 as an example, the user knows that Event_A will kick off a process that runs in an unknown amount of time and that Event_B will be fired when this processing is completed. Therefore, according to preferred embodiments, upon receipt of Event_A, the user-provided listener (not shown in FIG. 1) notifies the time table that the system is now "busy" doing processing. Accordingly, if the time table is queried (e.g., to determine whether another test step can be executed), the current "busy" status will be detected. When the user-provided listener receives Event_B, it notifies the time table that the system has finished its current processing (and the system status is thus changed to "idle" or another "not busy" indicator).

A single test system listener may be used, where this user-provided listener is written to receive and respond to all events of interest to the test suite. Alternatively, more than one user-provided listener may be used, where each listener handles some subset of the events of interest. In addition to these one or more test system listeners, users of the present invention also supply the contents of the test cases for the test suite. A test suite may be comprised of one or more test cases. Preferably, test cases are structured as collections of one or more test modules, where a test module comprises one or more test steps (such as method invocations) and is designed as a logical unit of work that can serve as a building block for test cases. Test cases can then reuse these test modules to create different kinds of test scenarios. (Alternatively, some or all test cases may be comprised of test steps that do not form part of a separately-defined test module.)

Figure 4:
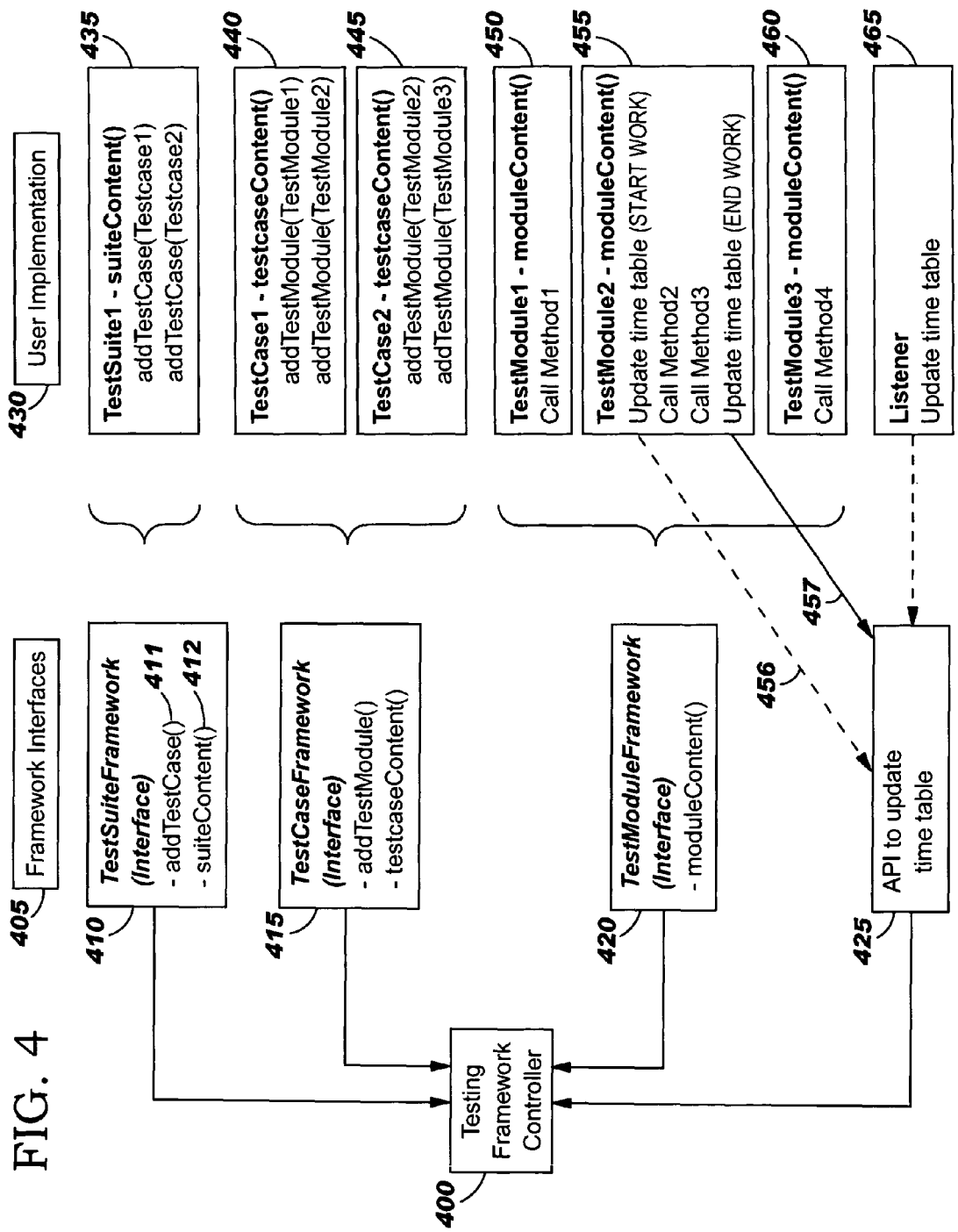
FIG. 4 provides a logical view of interfaces and components of the automated testing framework of preferred embodiments.

The testing framework of preferred embodiments provides interfaces for three different levels of test functionality: TestSuite, TestCase, and TestModule. (Support for reusable test modules is optional, and the TestModule interface may therefore be omitted in alternative embodiments without deviating from the scope of the present invention.) FIG. 4 depicts a logical view of interfaces and components of the automated testing framework of preferred embodiments, as will now be described.

A testing framework controller 400 supports a TestSuiteFramework interface 410, a TestCaseFramework interface 415, a TestModuleFramework interface 420, and a time-table-updating interface 425. Preferred embodiments of the TestSuiteFramework interface 410, for example, support adding a test case to the test suite content (see reference numbers 411 and 412). Whereas the test framework interfaces are shown in a column appearing in the middle of FIG. 4 (see, generally, reference number 405), user implementations are depicted in a column 430 appearing at the right-hand side of FIG. 4. Thus, a user implementation of a test suite implements the TestSuiteFramework interface and supplies the contents of the test suite by adding test cases to the suite. See reference number 435, where a sample illustrates invoking the "addTestCase( )" method for a first test case named "Testcase1" and for a second test case named "Testcase2". The test cases are preferably created in an analogous manner. Reference numbers 440 and 445 illustrate samples of defining test cases by invoking the "addTestModule( )" method and passing names of particular test modules as input. Similarly, test modules are created and can be added to various test cases. Reference numbers 450, 455, and 460 illustrate specification of three sample test modules. (Note that the test module named "TestModule2" is reused in this example, as it is specified for both TestCase1 440 and TestCase2 445.) Thus, for the sample test suite defined by the user-provided information at reference numbers 435, 440, 445, 450, 455, and 460, the test execution sequence is as follows: TestModule1 (from TestCase1), TestModule2 (from TestCase1), TestModule2 (from TestCase2) and TestModule3 (from TestCase2).

Reference number 465 illustrates the user-provided listener, which is written to invoke the time-table-updating API 425 upon occurrence of events from which test system status can be determined. (Note that preferred embodiments are described herein in terms of notifying the time table only of busy/idle-type status changes. In alternative embodiments, additional information may be communicated using this API, such as an indication of which event has started or completed.)

By implementing the interfaces 410, 415, and 420, the test suite will be seamlessly integrated with the testing framework controller 400. As each entity of the test suite is defined, preferred embodiments record information about the structure of the suite for run-time use by the testing framework controller. For example, using the samples depicted in FIG. 4, the testing framework controller can determine that the test suite named "TestSuite1" is comprised of two test cases (see reference number 435), and each of these test cases is comprised of two test modules (see reference numbers 440, 445). As the test suite executes, the user-provided listener (see reference number 465) will provide updates to the time table that the testing framework controller will use to manage this user-provided test execution sequence.

It may happen that code executed by some test modules (or test cases, in the absence of test modules) does not trigger any events in the event-driven system. In this case, the user preferably annotates the test module (or test case) to directly update the time table. This is illustrated at reference numbers 456 and 457, where the time table is updated (reference number 456) to record that work has been started, prior to execution of the method named "Method2", and is then updated again (reference number 457) to record that the work has been completed, following execution of the method named "Method3". Recall that the user or users designing the test suite is/are aware of the content of the methods being tested, and will therefore know whether the methods themselves fire events. Thus, in this example, it is not necessary to annotate TestModule1 450 because the user knows that this particular invoked method, "Method1" (which was depicted in FIG. 1), contains its own event-triggering code. The user therefore includes, within user-provided listener 465, code that updates the time table appropriately upon the firing of events by Method1. (See the discussion of FIG. 5, below, for more information on this user-provided listener 465.)

Figure 5:
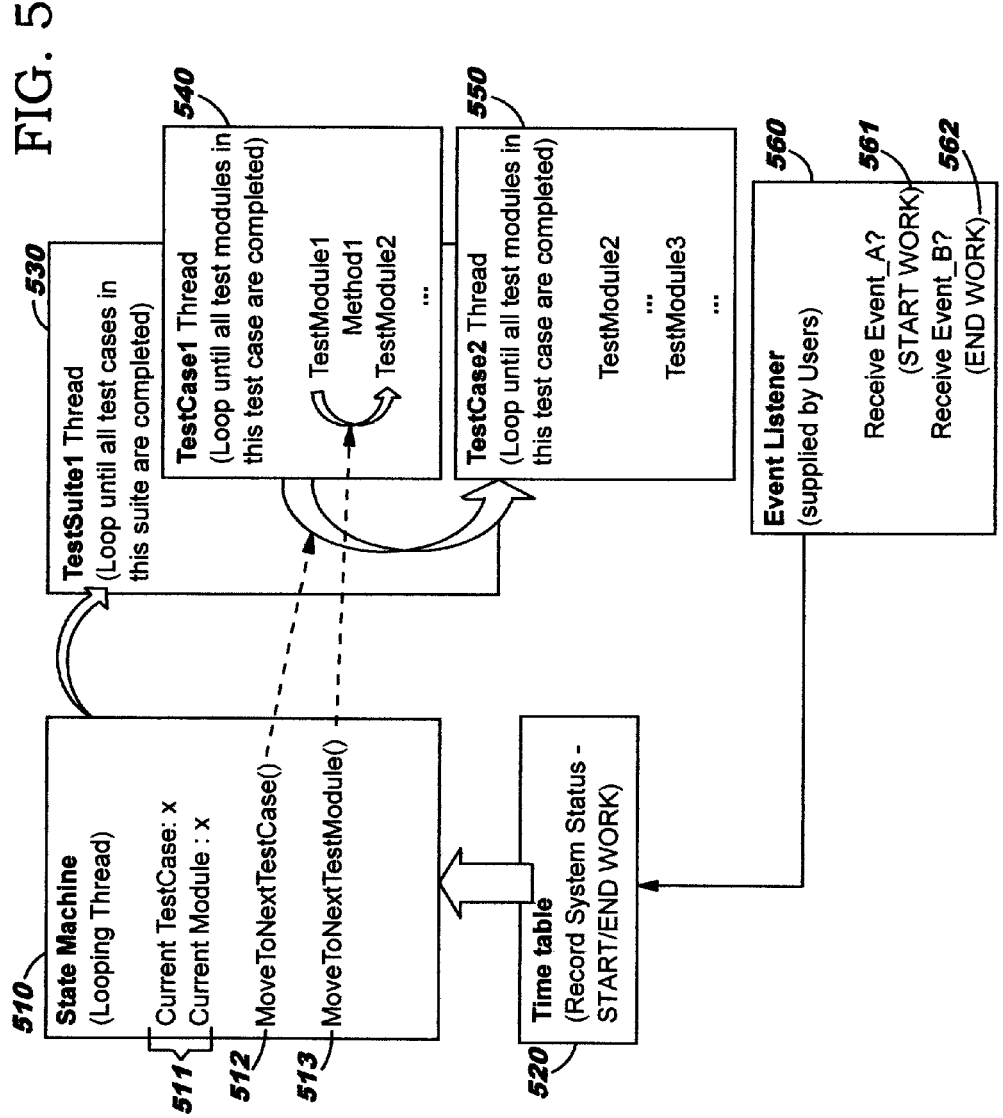
FIG. 5 provides a diagram showing operation of a testing framework controller of preferred embodiments.

FIG. 5 illustrates operation of a testing framework controller 400 of preferred embodiments, and in this example, is depicted as executing the sample user-provided information shown generally in column 430 of FIG. 4. The testing framework controller contains a state machine thread 510 that continues to loop, until completion of the test suite, to coordinate the effort of running the test cases and their test modules in order and one after another.

Preferably, when the test system is started, the state machine thread 510 starts and runs continuously to monitor the time table 520. Using information registered by invocations of the framework interfaces 405, the test system initiates execution of the test suite (TestSuite1, in this example) which was implemented by the users. Preferably, a separate thread is used for the test suite, as shown at 530. The registered test suite information identifies TestCase1, in this example, as the first test case to be executed. Thus, preferred embodiments initiate execution of that first test case in yet another thread 540. (Using separate threads for the test suite, test case, and state machine is believed by the present inventors to simplify the state machine.)

The thread used for TestCase1 is a thread that runs until all the test modules in that test case are completed. It preferably keeps track of which module it has run and which one it should run next. In the example, as TestModule1 is executed, Method1 is called and, according to the code 110 of FIG. 1, Event_A is fired. The event listener 560 receives notification of Event_A and, in response (as shown generally at 561), updates the time table 520 to indicate that work (i.e., testing) has started. The state machine thread 510 of preferred embodiments checks the time table on a regular basis (e.g., at configured or default intervals) and therefore knows that the event-driven system is currently doing work. Some time later, the event-driven system finishes the processing of Method1 and its Event_A, and Event_B is therefore fired. The event listener 560 receives notification of Event_B and, in response (as shown generally at 562), updates the time table 520 to indicate that work has ended. On its next check of the time table, the state machine thread 510 sees that the system has completed its task at hand, and will move the test to the next stage. In preferred embodiments, this comprises using the information registered in response to the test framework interface invocations (such as "addTestCase( )" and "addTestModule( )", which were discussed with reference to FIG. 4) to determine the next test module, if any, and the next test case, if any. (The state machine thread 510 also preferably records information indicating which test case and test module are currently being executed, as shown generally at 511.) Upon determining that another module remains to be executed in this test case, the state machine thread 510 preferably invokes a method such as "MoveToNextTestModule( )", as depicted at 513 in FIG. 5. The thread used for TestCase1 preferably checks with the state machine on a regular basis, and will therefore know that the state machine has moved the test to the next stage in this manner (e.g., by setting a flag indicating that the next module can now be executed); thread 540 will then initiate execution of the next test module. (Alternatively, the state machine thread 510 may signal the thread used for the test suite or the thread used for the test case, responsive to determining that the time table shows the current processing as having ended. As an example of this alternative approach, the thread for TestCase1 initiates execution of the next module, TestModule2, upon receiving a signal from the state machine after the state machine learns of the completion of TestModule1.)

When all the test modules in the currently-executing test case are completed, the thread used for that test case execution will preferably be terminated. At this point, the next check of the time table 520 by state machine 510 will indicate that the current processing has ended. If the suite has not yet completed (as may be determined using the previously-registered test suite information), the state machine thread 510 preferably invokes a method such as "MoveToNextTestCase( )", as depicted at 512. The thread 530 used for the test suite will then detect (either by checking with the state machine, or alternatively by receiving a signal therefrom) that the test case has ended, and will then start a thread for its next test case (e.g., the TestCase2 thread 550, in this example). The test modules inside that test case will be run under control of the state machine in a similar manner to that which has been described for the first test case.

The direct invocations of the time-table-updating API which were previously discussed with reference to 456 and 457 of FIG. 4 execute during execution of their containing test module, enabling the time table to reflect the user-defined starting of work and ending of work in the absence of events fired by the code under test.

The testing framework disclosed herein can be adapted to automate testing on any event-driven systems. It is transparent, in that it does not require any modifications in the event-driven system itself because the testing framework and software of the test system are external to the event-driven systems. It is extensible, in that the test suite designer controls the definition of a particular test suite; the test suite is then iteratively executed by the testing framework, based on this definition.

As will be appreciated by one of skill in the art, embodiments of the present invention may be provided as (for example) methods, systems, and/or computer program products. The present invention may take the form of an entirely hardware embodiment, an entirely software embodiment, or an embodiment combining software and hardware aspects. Furthermore, the present invention may take the form of a computer program product which is embodied on one or more computer-usable storage media (including, but not limited to, disk storage, CD-ROM, optical storage, and so forth) having computer-usable program code embodied therein.

The present invention has been described with reference to flow diagrams and/or block diagrams according to embodiments of the invention. It will be understood that each flow and/or block of the flow diagrams and/or block diagrams, and combinations of flows and/or blocks in the flow diagrams and/or block diagrams, can be implemented by computer program instructions. These computer program instructions may be provided to a processor of a general purpose computer, special purpose computer, embedded processor, or other programmable data processing apparatus to produce a machine, such that the instructions, which execute via the processor of the computer or other programmable data processing apparatus, create means for implementing the functions specified in the flow diagram flow or flows and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flow diagram flow or flows and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flow diagram flow or flows and/or block diagram block or blocks.

While preferred embodiments of the present invention have been described, additional variations and modifications in those embodiments may occur to those skilled in the art once they learn of the basic inventive concepts. Therefore, it is intended that the appended claims shall be construed to include preferred embodiments and all such variations and modifications as fall within the spirit and scope of the invention.

What is claimed is:

1. A computer-implemented method of coordinating execution of automated testing in an event-driven system, comprising:
   registering a test system listener to listen for events generated by execution of the event-driven system being tested, wherein the test system listener is distinct from event listeners of the event-driven system and executes externally to the event-driven system;
   receiving, by the registered test system listener, notification of the events generated by the execution of the event-driven system;

updating a current testing status indication, by the test system listener responsive to ones of the received event notifications that signal work starting in the event-driven system and other ones of the received event notifications that signal work ending in the event-driven system, to indicate whether the event-driven system is currently executing; and using the current testing status indication, by a test controller that monitors the current testing status indication and which is distinct from the test system listener, to allow the testing to progress when the event-driven system has completed executing a current stage of the testing.

2. The method according to claim 1, wherein the updating further comprises the test system listener triggering the updating by sending an update message.

3. The method according to claim 1, wherein the updating further comprises the test system listener invoking an application programming interface that triggers the updating.

4. The method according to claim 1, wherein:
a plurality of test system listeners are registered, each for listening to a particular subset of the events generated by the execution of the event-driven system and each of which is distinct from the event listeners of the event-driven system and each of which executes externally to the event-driven system;

the notifications of the events are received at corresponding ones of the plurality of test system listeners that registered for listening to the particular subset comprising the events corresponding to the notifications; and each of the test system listeners performs the updating responsive to ones of the received event notifications that signal work starting in the event-driven system and the other ones of the received event notifications that signal work ending in the event-driven system.

5. The method according to claim 1, further comprising the test controller dynamically learning a definition of a test suite to be used for the testing, and wherein using the current testing status indication to allow the testing to progress further comprises:

using the dynamically-learned test suite definition, by the test controller, to determine a next stage of the testing; and progressing the testing to the next stage when the current testing status indication indicates that the current stage of the testing has completed, and otherwise, not progressing the testing to the next stage.

6. The method according to claim 5, further comprising:
programmatically invoking an application programming interface of a testing system used for the automated testing to register the definition of the test suite for the dynamically learning by the test controller, the definition of the test suite comprising an identification of each of at least one test case in the test suite and, for each of the at least one test case, an identification of each of at least one test step in the test case, at least one of the test steps causing at least one of the events to be generated by the execution of the event-driven system; and wherein using the dynamically-learned test suite definition further comprises programmatically consulting the registered definition, by the test controller, to identify a next one of the test cases to be executed or a next one of the test steps to be executed, until completing the automated testing.

7. The method according to claim 1, wherein the current test status indication comprises a Boolean indicator of whether testing work is currently being performed.

8. The method according to claim 1, wherein the updating further comprises:
updating the current testing status indication to busy if the received event notification signals work starting; and
updating the current testing status indication to not busy if the received event notification signals work ending.

9. A computer-implemented method comprising:
dynamically learning a test suite structure, the test suite structure comprising at least one test case, each of the at least one test case comprising at least one test step for invoking execution of code of an event-driven system being tested, wherein the code of the event-driven system fires at least one event, the dynamically learning further comprising:
executing first code, for each of the at least one test case, that identifies a name of the test case as being part of the test suite structure; and
executing second code, for each of the at least one test case, that identifies a name of each of the at least one test step of which that test case is comprised as being part of the test case;

registering a test system listener to listen for the fired events, wherein the test system listener is distinct from a test controller and from event listeners of the event-driven system and executes externally to the event-driven system;

executing the test steps of the test cases of the test suite, thereby invoking the execution of the code of the event-driven system;

updating, by the registered test system listener, a test status to indicate that one of the test steps is executing, responsive to receiving a notification at the registered test system listener that one of the events that signals work starting in the event-driven system has been fired by the code of the event-driven system, and updating, by the registered test system listener, the test status to indicate that the test step is no longer executing, responsive to receiving a notification at the registered test system listener that one of the events that signals work ending in the event-driven system has been fired by the code of the event-driven system; and monitoring the test status, by the test controller, and preventing a next one of the test steps from executing when the test status indicates that one of the test steps is still executing and otherwise allowing the next one of the test steps to execute.

10. A system for coordinating execution of automated testing in an event-driven system, the system comprising a computer comprising a processor and instructions configured to execute, using the processor, to carry out functions comprising:

registering a test system listener to listen for events generated by execution of the event-driven system being tested, wherein the test system listener is distinct from event listeners of the event-driven system and executes externally to the event-driven system;

receiving, by the registered test system listener, notification of the events generated by the execution of the event-driven system;

updating a current testing status indication, by the test system listener responsive to ones of the received event notifications that signal work starting in the event-driven system and other ones of the received event notifications that signal work ending in the event-driven system, to indicate whether the event-driven system is currently executing; and using the current testing status indication, by a test controller that monitors the current testing status indication and which is distinct from the test system listener, to allow the testing to progress when the event-driven system has completed executing a current stage of the testing.

11. The system according to claim 10, wherein:

a plurality of test system listeners are registered, each for listening to a particular subset of the events generated by the execution of the event-driven system and each of which is distinct from the event listeners of the event-driven system and each of which executes externally to the event-driven system;

the notifications of the events are received at corresponding ones of the plurality of test system listeners that registered for listening to the particular subset comprising the events corresponding to the notifications; and each of the test system listeners performs the updating responsive to ones of the received event notifications that signal work starting in the event-driven system and the other ones of the received event notifications that signal work ending in the event-driven system.

12. The system according to claim 10, wherein the instructions are further configured to carry out functions comprising the test controller dynamically learning a definition of a test suite to be used for the testing, and wherein using the current testing status indication to allow the testing to progress further comprises:

using the dynamically-learned test suite definition, by the test controller, to determine a next stage of the testing; and progressing the testing to the next stage when the current testing status indication indicates that the current stage of the testing has completed, and otherwise, not progressing the testing to the next stage.

13. The system according to claim 12, wherein:

the instructions are further configured to carry out functions comprising programmatically invoking an application programming interface of a testing system used for the automated testing to register the definition of the test suite for the dynamically learning by the test controller, the definition of the test suite comprising an identification of each of at least one test case in the test suite and, for each of the at least one test case, an identification of each of at least one test step in the test case, at least one of the test steps causing at least one of the events to be generated by the execution of the event-driven system; and using the dynamically-learned test suite definition further comprises programmatically consulting the registered definition, by the test controller, to identify a next one of the test cases to be executed or a next one of the test steps to be executed, until completing the automated testing.

14. A computer program product for coordinating execution of automated testing in an event-driven system, wherein the computer program product is embodied on one or more computer-usable storage media and comprises computer-usable program code for:

registering a test system listener to listen for events generated by execution of the event-driven system, wherein the test system listener is distinct from event listeners of the event-driven system and executes externally to the event-driven system;

receiving, by the registered test system listener, notification of the events generated by the execution of the event-driven system;

updating a current testing status indication, by the test system listener responsive to ones of the received event notifications that signal work starting in the event-driven system and other ones of the received event notifications that signal work ending in the event-driven system, to indicate whether the event-driven system is currently executing; and using the current testing status indication, by a test controller that monitors the current testing status indication and which is distinct from the test system listener, to allow the testing to progress when the event-driven system has completed executing a current stage of the testing.

15. The computer program product according to claim 14, wherein:

a plurality of test system listeners are registered, each for listening to a particular subset of the events generated by the execution of the event-driven system and each of which is distinct from the event listeners of the event-driven system and each of which executes externally to the event-driven system;

the notifications of the events are received at corresponding ones of the plurality of test system listeners that registered for listening to the particular subset comprising the events corresponding to the notifications; and each of the test system listeners performs the updating responsive to ones of the received event notifications that signal work starting in the event-driven system and the other ones of the received event notifications that signal work ending in the event-driven system.

16. The computer program product according to claim 14, further comprising computer-usable program code for the test controller dynamically learning a definition of a test suite to be used for the testing, and wherein using the current testing status indication to allow the testing to progress further comprises:

using the dynamically-learned test suite definition, by the test controller, to determine a next stage of the testing; and progressing the testing to the next stage when the current testing status indication indicates that the current stage of the testing has completed, and otherwise, not progressing the testing to the next stage.

17. The computer program product according to claim 16, wherein:

the computer-usable program code further comprises programmatically invoking an application programming interface of a testing system used for the automated testing to register the definition of the test suite for the dynamically learning by the test controller, the definition of the test suite comprising an identification of each of at least one test case in the test suite and, for each of the at least one test case, an identification of each of at least one test step in the test case, at least one of the test steps causing at least one of the events to be generated by the execution of the event-driven system; and using the dynamically-learned test suite definition further comprises programmatically consulting the registered definition, by the test controller, to identify a next one of the test cases to be executed or a next one of the test steps to be executed, until completing the automated testing.

* * * * *